United States Patent [19]

Blankenship et al.

[11] Patent Number: 4,594,363
[45] Date of Patent: * Jun. 10, 1986

[54] PRODUCTION OF CORE-SHEATH POLYMER PARTICLES CONTAINING VOIDS, RESULTING PRODUCT AND USE

[75] Inventors: Robert M. Blankenship, Lansdale; Alexander Kowalski, Plymouth Meeting, both of Pa.

[73] Assignee: Rohm and Haas Company, Philadelphia, Pa.

[*] Notice: The portion of the term of this patent subsequent to Jan. 24, 2001 has been disclaimed.

[21] Appl. No.: 690,913

[22] Filed: Jan. 11, 1985

[51] Int. Cl.$^4$ ................................................. C08J 9/28
[52] U.S. Cl. ........................................ 521/64; 264/53; 523/201; 525/902
[58] Field of Search ............... 427/213.31, 213.34; 428/402.24; 521/59, 64; 523/201; 525/902; 264/53, 343

[56] References Cited

U.S. PATENT DOCUMENTS

| | | | |
|---|---|---|---|
| 3,359,130 | 12/1967 | Goldman | 264/53 X |
| 3,864,181 | 2/1975 | Wolinski et al. | 264/45.3 X |
| 4,008,304 | 2/1977 | Koyama et al. | 264/343 X |
| 4,089,800 | 5/1978 | Temple | 427/213.31 |
| 4,427,836 | 1/1984 | Kowalski et al. | 525/301 |
| 4,479,911 | 10/1984 | Fong | 428/402.24 X |

Primary Examiner—Richard D. Lovering
Attorney, Agent, or Firm—Michael B. Fein

[57] ABSTRACT

Process for making core-sheath polymer particles containing voids, said particles useful for opacifying, comprising (A) emulsion polymerizing a core from a core monomer system comprised of at least one ethylenically unsaturated monomer containing acid functionality; (B) encapsulating said core with a hard sheath by emulsion polymerizing a sheath monomer system in the presence of said core, said sheath permitting penetration of fixed or permanent bases; (C) swelling at elevated temperature the resultant core-sheath polymer particles with fixed or permanent base so as to produce a dispersion of particles which, when dried, contain a microvoid which causes opacity in compositions in which they are contained, provided that either (1) said sheath comprises at least about 1% acid functional monomer or (2) said swelling takes place in the presence of solvent.

Compositions comprising said core-sheath polymer particles are also disclosed.

17 Claims, No Drawings

PRODUCTION OF CORE-SHEATH POLYMER PARTICLES CONTAINING VOIDS, RESULTING PRODUCT AND USE

FIELD OF THE INVENTION

This invention relates to microvoid containing polymer particles which serve as binding or opacifying agents in coating, impregnating, and molding compositions.

DESCRIPTION OF THE PRIOR ART

Kowalski et al U.S. Pat. No. 4,427,836 disclose core-sheath polymer particles containing voids, prepared by sequentially emulsion polymerizing a core monomer system comprising monoethylenically unsaturated monomers, at least one of which having a carboxylic acid group and said carboxylic acid group containing monomer comprising at least 5% by weight of the core monomer system, polymerizing in the presence of the core polymer dispersion a sheath monomer system which is permeable to aqueous volatile base selected from ammonia and amines, and neutralizing with ammonia or amine so as to swell said core and form particles which, when dried, contain a single void and cause opacity in compositions in which they are contained. The composition of the sheath polymer is such as to be not permeable to fixed or permanent base according to said patent "so that films deposited from aqueous coating compositions comprising a volatile base-swollen core of the core/sheath polymer upon drying and resultant (at least partial) removal by volatilization of the base are not damaged by any permanent base present in the substrate coated or in solutions used later for cleaning the films." (Column 3, lines 35-41.) Said patent teaches that "suitable swelling agents for acid-containing cores are ammonia, ammonium hydroxide, or a volatile lower aliphatic amine, such as trimethylamine, and triethylamine."

It has been discovered by the present inventors that in certain cases the presence of such volatile base swelling agents in the formulation causes odor problems in the final product which are undesirable in certain applications.

SUMMARY OF THE INVENTION

It is therefore an object of the present invention to provide core-sheath opacifying agents which do not have the odor problems associated with the use of volatile base swelling agents.

This object and others which will become apparent from the following disclosure are achieved by the present invention which comprises a process for making core-sheath polymer particles containing voids, said particles useful for opacifying, comprising (A) emulsion polymerizing a core from a core monomer system comprised of at least one ethylenically unsaturated monomer containing acid functionality; (B) encapsulating said core with a hard sheath by emulsion polymerizing a sheath monomer system in the presence of said core, and sheath permitting penetration of fixed or permanent bases; and (C) swelling at elevated temperature the resultant core-sheath polymer particles with fixed or permanent base so as to produce a dispersion of particles which, when dried, contain a microvoid which causes opacity in compositions in which they are contained, provided that either (1) said sheath comprises at least about 1% acid functional monomer or (2) said swelling takes place in the presence of solvent.

In another aspect, the invention comprises compositions comprising core-sheath polymer particles prepared by said process, and articles which are coated with, impregnated with, or molded with the compositions.

DETAILED DESCRIPTION OF THE INVENTION AND THE PREFERRED EMBODIMENTS

The core polymer may be the product of aqueous emulsion polymerization of one or more monoethylenically unsaturated monomers containing a group of the formula —H=C< and a carboxylic acid group. Suitable ethylenically unsaturated monomers containing acid functionality include acrylic acid and methacrylic acid, which are preferred, and (meth)acryloxypropionic acid, itaconic acid, aconitic acid, maleic acid or anhydride, fumaric acid, crotonic acid, monomethyl maleate, monomethyl fumarate, and monomethyl itaconate.

The core polymer may be obtained by the emulsion homopolymerization of such an acid monomer or by copolymerization of two or more acid monomers. However, in preferred embodiments, an acid monomer or a mixture of acid monomers is copolymerized with one or more ethylenically unsaturated monomers of non-ionic character (that is, having no ionizable group) having one or more ethylenic unsaturated groups of the formula $H_2C=C<$.

Examples of nonionic monoethylenically unsaturated monomers include styrene, vinyltoluene, ethylene, vinyl acetate, vinyl chloride, vinylidene chloride, acrylonitrile, (meth)acrylamide, various ($C_1$–$C_{20}$)alkyl or ($C_3$–$C_{20}$)alkenyl esters of (meth)acrylic acid, (The expression (meth)acrylic acid is intended to serve as a generic expression embracing both acrylic acid and methacrylic acid) e.g., methyl methacrylate, methyl acrylate, ethyl(meth)acrylate, butyl(meth)acrylate, 2-ethylhexyl(meth)acrylate, benzyl(meth)acrylate, lauryl(meth)acrylate, oleyl(meth)acrylate, palmityl(meth)acrylate, and stearyl(meth)acrylate. In general, core copolymers containing at least about 5%, preferably at least 10%, by weight of acid mers have practical swellability for the purposes of the present invention but there may be instances wherein, because of the hydrophobicity of certain comonomers or combinations thereof in conjunction with the hydrophobic/hydrophilic balance of a particular acid monomer, the copolymer may require somewhat less than 5 weight percent of acid monomer or considerably more than 5 weight percent thereof, and in the latter instance, a preferred proportion of acid monomer is at least 10 weight percent based on the total weight of core-producing monomer mixture. As may be seen by the reference to homopolymerization of an acid monomer core, the invention includes a core which contains 100% of the addition polymerizable carboxylic acid. A preferred maximum quantity of acid monomer is about 70% of the total core monomers, by weight.

The core polymer may comprise as one component thereof a small amount of a polyethylenically unsaturated monomer, such as ethylene glycol di(meth)acrylate, allyl(meth)acrylate, 1,3-butane-diol di(meth)acrylate, diethylene glycol di(meth)acrylate, trimethylolpropane trimethacrylate, or divinylbenzene, the proportion thereof being in the range of about 0.1% to 20%, preferably 0.1% to about 3%, by weight, based on the total monomer weight of the core, the amount used generally being approximately directly proportional to the amount of acid monomer used. Butadiene is exceptional in that it often functions as a monoethylenically unsaturated monomer especially in mixtures with styrene so the amount of butadiene, if used, may be as much as 30 to 60 percent by weight of the total core monomer weight.

While the core may be made in a single stage or step of the sequential polymerization and the sheath may be the product of a single sequential stage or step following the core stage, nevertheless, the making of the core component may involve a plurality of steps in sequence followed by the making of the sheath which may involve a series of sequential steps as well.

Thus, the first stage of emulsion polymerization in the process of the present invention may be the preparation of a seed polymer consisting of small dispersed polymer particles insoluble in the aqueous emulsion polymerization medium. This seed polymer may or may not contain any acid component but provides particles of minute size which form the nuclei on which the core polymer of acid monomer, with or without nonionic comonomer(s), is formed.

As is common to aqueous emulsion polymers, there is used a water-soluble free radical initiator, such as hydrogen peroxide, tert-butyl peroxide, or an alkali metal (sodium, potassium or lithium) or ammonium persulfate or a mixture of such an initiator with a reducing agent, such as a sulfite, more specifically an alkali metal metabisulfite, hydrosulfite, or hyposulfite, or sodium formaldehyde sulfoxylate, to form a redox system. The amount of initiator may be from 0.01 to about 2% by weight of the monomer charged and in a redox system, a corresponding range (0.01 to about 2%) of reducing agent may be used. The temperature may be in the range of about 10° C. to 100° C. In the case of the persulfite systems, the temperature is preferably in the range of 60° to 90° C. In the redox system, the temperature is preferably in the range of 30° to 70° C., preferably below about 60° C., more preferably in the range of 30°–45° C. The proportion of emulsifier may be zero, in the situation wherein a persulfate initiator is used, to about 0.3 weight percent, based on the weight of monomer charged to the first stage of polymerization. By carrying out the emulsion polymerization while maintaining low levels of emulsifier, the subsequent stages of polymer-formation deposit the most-recently formed polymer on the existing dispersed polymer particles resulting from the preceding step or stage. As a general rule, the amount of emulsifier should be kept below that corresponding to the critical micelle concentration for a particular monomer system, but while this limitation is preferable and produces a unimodal product, it has been found that in some systems the critical micelle concentration of the emulsifier may be exceeded somewhat without the formation of an objectionable or excesive number of disperse micelles or particles.

Any nonionic or anionic emulsifier may be used, either alone or together. Examples of the nonionic type of emulsifier include tert-octylphenoxyethylpoly(39)ethoxyethanol, and nonylphenoxyethylpoly(40)ethoxyethanol. Examples of anionic emulsifiers include sodium lauryl sulfate, sodium dodecyl benzene sulfonate, and tertoctylphenoxyethoxypoly(39)ethoxyethyl sulfate, sodium salt.

The viscosity average molecular weight of the polymer formed in a given stage may range from 100,000, or lower if a chain transfer agent is used, to several million. When 0.1 to 20 weight % of a polyethylenically unsaturated monomer mentioned hereinbefore is used in making the acid polymer, the molecular weight is increased whether or not crosslinking occurs. The use of the polyethylenically unsaturated monomer reduces the tendency of the core polymer to dissolve when the multistage polymer is treated with a swellant for the core. If it is desired to produce an acid polymer having a molecular weight in the lower part of the range, such as from 500,000 down to as low as about 20,000, it is frequently most practical to do so by avoiding the polyethylenically unsaturated monomers and using a chain transfer agent instead, such as 0.05 to 2% or more thereof, examples being a lower alkyl mercaptan, such as sec-butyl mercaptan.

The acid-containing core polymer, whether obtained by a single stage process or a process involving several stages, has an average size of about 0.05 to about 1.0, preferably 0.1 to 0.5, more preferably 0.1 to 0.3 micron diameter in unswollen condition. If the core is obtained from a seed polymer, whether or not the latter contains acid groups or mers, the seed polymer may have an average size in the range of 0.03 to 0.2 micron diameter.

After the acid core is obtained, a subsequent stage or stages of emulsion polymerization is effected to form a sheath polymer on the acid core polymer particles or micelles. This may be performed in the same reaction vessel in which the formation of the core was accomplished or the reaction medium containing the dispersed core particles may be transferred to another reaction container. It is generally unnecessary to add emulsifier unless a polymodal product is desired, but in certain monomer/emulsifier systems for forming the sheath the tendency to produce gum or coagulum in the reaction medium may be reduced or prevented by the addition to about 0.5 to about 0.5% by weight, based on sheath-forming monomer weight, of emulsifier without detriment to the deposition of the polymer formed on the previously formed core particles.

The sheath monomer system must either (1) comprise at least about 1% by weight acid functional monomer, and the balance may be any of the nonionic monoethylenically unsaturated comonomers mentioned hereinbefore by making of the core, or (2) the swelling takes place in the presence of a solvent. In this aspect, the invention is different from that disclosed in U.S. Pat. No. 4,427,836 because acid functional monomer was not a requirement in the sheath monomer system in said prior patent, and the presence of a solvent was not mentioned. Due to the presence of the acid functional monomer in said sheath monomer system, the resultant hard sheath permits penetration of fixed or permanent bases at elevated temperature. It is preferred that the sheath monomer system be all acrylic, and in one particularly preferred embodiment the sheath monomer system comprises butyl methacrylate and methyl methacrylate and about 1 to 10% by weight methacrylic acid.

The preferred temperature range at which the sheath is permeable to the fixed or permanent base and swelling the core with said base takes place is about 50° C. to 100° C., most preferably about 80° to 90° C.

The preferred amount of acid functional monomer in said sheath monomer system is about 5 to 10% by weight when solvent is not used, and about 1 to 2% by weight when solvent is used.

The solvent, when used, assists in penetration of the shell by the fixed or permanent base. Suitable amounts of solvent are about 1 to 100 parts by weight, based on 100 parts by weight core-sheath polymer, preferably about 5–10 parts by weight. Suitable solvents are any which will plasticize the shell, for example, hexanol, ethanol, 3-hydroxy-2,2,4-trimethylpentyl isobutyrate, toluene, mixtures of solvents, and the like. The solvent can be added either before, after, or with the addition of the base. In certain cases the sheath monomer system itself can function as the solvent for the sheath monomer system.

Suitable fixed or permanent bases are potassium hydroxide, lithium hydroxide, sodium hydroxide, calcium hydroxide, zinc, copper, or silver ammonium complexes, or strontium and barium hydroxides.

It is preferred that at least one additional sheath (D) is polymerized subsequent to the swelling step, and a preferred monomer system for said additional sheath is styrene.

The amount of polymer deposited to form sheath polymer is generally such as to provide an overall size of the multistage polymer particle of about 0.07 to about 4.5 microns, preferably about 0.1 to about 3.5 microns, more preferably about 0.2 to about 2.0 microns, in unswollen condition (that is, before any neutralization to raise the pH to about 6 or higher) whether the sheath polymer is formed in a single stage or in a plurality of stages. In unswollen state, the ratio of core weight to the total weight on average is from 1:4 to 1:100, preferably 1:8 to 1:50. After volatilization of the water from the enlarged, swollen particle, to produce a microvoid therein, the ratio of void volume to total volume of the particle on average should be from about 5% to 95% and preferably is at least 15%. Generally, a single void is formed in each particle.

The multistage heterogeneous particulate polymer containing the acid core is swollen when the particles are subjected to an aqueous basic swellant that permeates the sheath and expands the core, which expansion may involve partial merging of the outer periphery of the core into the pores of the inner periphery of the sheath and also partial enlargement or bulging of the sheath and the entire particle overall. When the swellant is removed by drying, the shrinkage of the core tends to develop a microvoid, the extent of which depends on the resistance of the sheath to restoration to its previous size.

The monomer or monomers of the sheath may be selected to produce a sheath polymer having a relatively moderate to high glass transition temperature or inflection temperature which is found by plotting the modulus of rigidity against temperature. A convenient method for determining modulus of rigidity and transition temperature is described by I. Williamson, British Plastics 23, 87–90, 102 (September 1950). The $T_i$ Value here used is that determined at 300 kg/cm$^2$.

The core is preferably relatively hard, as indicated by calculated or measured core $T_i$, or the core polymer is crosslinked by a polyunsaturated monomer. A useful limit for hardness (or softness) of the core is that less than 40% of butyl acrylate ($T_i$ of between $-50°$ and $-55°$ C.) is used, or no more than an amount of an equivalent monomer is used which would give a comparable $T_i$ when using the same comonomer combination. Thus, for a copolymer of 40% butyl acrylate and 60% methyl methacrylate, the calculated $T_i$ is about 20° C. When ethyl acrylate is substituted for butyl acrylate, a copolymer of 60% ethyl acrylate and 40% methyl methacrylate gives a calculated $T_i$ of about 17° C. Of course, the acid monomer confers a higher $T_i$. When using different monomer compositions, particularly with crosslinkers, this rule of thumb is not always strictly applicable. Nevertheless, it is a useful guideline.

It is preferred, for formation of microvoids, to select the monomer or monomers and the relative proportions thereof in the sheath-producing stage to produce a sheath polymer having a $T_i$ of at least 25° C., and preferably between 50° and 100° C. The swelling and subsequent removal of the swelling agent in this instance favors the formation and retention of the microvoids. The swelling may be carried out at a temperature corresponding to the $T_i$, or somewhat above it, to favor rapid penetration of the swelling agent through the sheath to swell the core and by softening the sheath, to allow the core greater freedom of expansion against the confinement by the sheath. After expansion by the swellant to the desired extent, the expanded particles are cooled to a temperature below their $T_i$ to set the sheath and then the swellant is removed (at least partially) from the particles by drying at the lower temperature, resulting in the formation of microvoids in the cores of the particles. For the best results to obtain microvoids, it is important to remove water rapidly from the cores. Slow drying at high humidity may be detrimental to microvoid formation.

In another preferred embodiment the sheath is crosslinked by including in the monomer mixture used for forming the sheath about 1% to 50% by weight, based on the total monomer weight in the mixture, of a polyethylenically unsaturated monomer such as one of those mentioned hereinbefore for making the core polymer. The crosslinking of the sheath serves to render it more stable structurally so that on drying the swollen particles to remove swellant, the shrinkage of the swollen core produces microvoids therein but the sheath resists collapse so that the microvoids formed are essentially retained within the particle which also remains essentially in spherical shape. One method involving the formation of a crosslinked sheath is to swell the dispersed polymer particles by neutralization of the acid-containing core just before the stage of polymerizing the crosslinked phase of the sheath, or before completion of this stage when the content of polyethylenically unsaturated monomer therein is over about 5 weight percent of the monomer mixture used therein, so that the last mentioned stage is carried out on the swollen particles and favors retention of the structure when voids are produced on subsequent removal of swellant.

In this last-mentioned embodiment wherein the sheath is crosslinked, this may be effected in a single sheath-forming stage or it may be effected by using a multistage sheath-forming procedure in which the polyethylenically unsaturated crosslinking monomer is omitted from the first sheath-forming monomer mixture but is included in the monomer mixture used in a later stage, such as the second or third stage. It is remarkable that even in this multistage procedure, the crosslinking frequently occurs at the interface between the acid core and the surrounding sheath so that the expanded structure of the sheath tends to be maintained, thereby favoring the development of microvoids in the core.

The multiple-stage core-sheath polymer dispersions of the present invention are useful for aqueous coating and impregnating compositions as opacifying agents in such compositions either as a supplement to, or replacement of, pigmentary matter and/or extenders therefor. For these purposes, the aqueous dispersions of the core-sheath polymer may be added directly to the coating and/or impregnating compositions. Alternatively, the core/sheath polymers may be isolated from the dispersions, after swelling of their cores, by filtration or decantation, and then the swellant may be removed, as by drying or volatilization, under conditions such that microvoids are formed and retained in the individual polymer particles or granules, the latter being more or less free-flowing in character so that they can be packaged, sold and shipped or stored before use. The dry powder thus obtained can also be used in coatings based on organic solvents provided the sheath component of the core-sheath particles is not soluble in the organic solvent.

In one modification, the acidic-core/sheath polymer particles having a $T_i$ of 50° C. or higher and/or a crosslinked sheath layer may be provided with an outer uncrosslinked relatively softer, film-forming layer having a $T_i$ of about 17° to 20° C. or lower so that the outer surfaces of these particles will coalesce at their juncture with each other and/or with the main binder polymer having a $T_i$ around room temperature or lower, upon drying at normal room temperatures. When the particles comprise a hard (especially $T_i$ of at least 50° C. to 100° C.) sheath layer, the uncrosslinked relatively softer exterior layer should have a $T_i$ less than 50° C., and at least 10° C., preferably 20° C., lower than that of the hard layer. This embodiment is useful in water-base house paints and industrial coatings wherein the core-/sheath polymer may serve as part of the binder when applied at ambient temperatures or at somewhat higher temperatures followed by a baking step.

Besides being useful in water-based paints based on vinyl or acrylic polymer latices or aqueous solutions of vinyl or acrylic polymers, to replace all or part of opacifying pigments heretofore used, especially those of titanium dioxide, the microvoid-containing particulate polymers of the present invention may be used for similar purposes in other coating systems including resin-forming condensation products of thermosetting type, such as phenoplasts and aminoplasts, including urea-formaldehyde and melamine-formaldehyde, and other condensates, e.g., water-dispersible alkyd resins. In addition, polymodal heterpolymers of the present invention having a predominant proportion of the microvoid-containing large mode and a relatively minor proportion of a small mode can serve not only the opacifying function of the main large mode but also provide an adhesion-promoting action by way of the small mode or modes.

In the following examples which are illustrative of the invention, the parts and percentages are by weight and temperatures are in degrees Celsius, unless otherwise states.

EXAMPLE 1

Preparation of Varied Acid Containing Sheaths

A 5-liter round bottomed flask was equipped with paddle stirrer, thermometer, nitrogen inlet and reflux condenser. To 2080 g. of deionized water heated to 80° was added 5.5 g. of sodium persulfate followed by 345 g. of an acrylic polymer dispersion (40% solids) with an average particle size of 0.06 micron as the seed polymer. A monomer emulsion consisting of 55.5 g. of butyl acrylate, 610.5 g. of methyl methacrylate and 444 g. of methacrylic acid in 406 g. of water and 20 g. of sodium dodecyl benzene sulfonate (23%) was added over a 2 hour period. This resulting alkali swellable core is used as the seed polymer for the following reactions:

A. A 2% Methacrylic Acid Containing Sheath

To a 5-liter kettle equipped with paddle stirrer, thermometer, nitrogen inlet and reflux condenser is added 675 g. of water. After heating to 80°, 1.7 gm. of sodium persulfate followed by 50.5 g. (1 part by weight solids) of the above alkali swellable core is added. A monomer emulsion (9 parts by solids) consisting of 110 gm. of water, 0.275 gm. of sodium dodecylbenzene sulfonate (23%), 27 gm. of butyl methacrylate, 106.5 gm. of methyl methacrylate and 2.75 gm. of methacrylic acid is added over a 2 hour period.

B. A 5% Methacrylic Acid Containing Sheath

By the same process as in A, 9 parts of polymer composition (by weight) of 20% butyl methacrylate, 75% methyl methacrylate and 5% methacrylic acid is grown on 1 part of the above core.

C. A 10% Methacrylic Acid Containing Sheath

By the same process as in A, 9 parts of a polymer of composition (by weight) of 20% butyl methacrylate, 70% methyl methacrylate and 10% methacrylic acid is polymerized onto 1 part of the above core.

Table 1 shows the results of titrating all three samples (Example 1 A–C) with 0.5N KOH at room temperature (RT) and the titration results with 0.5N HCl after all three samples had been heated at 85° to 30 minutes with sufficient KOH to swell the core polymer inside the sheath.

TABLE 1

| | Titration Results on A–C Example 1 | | |
|---|---|---|---|
| Sample | % MAA in Sheath | % KOH Taken-Up[1] at RT | % KOH Taken-Up[2] at 85° |
| A | 2 | 0% | 0% |
| B | 5 | 0% | 100% |
| C | 10 | 100% | 100% |

[1]Based on titration at RT of 5 g. of dispersion with 0.5 N KOH.
[2]Based on titration of heated mixture of dispersion/KOH with 0.5 N HCl.

Table 1 illustrates the role that increasing the sheath acid plays in hard base (e.g., KOH) neutralization of the encapsulated core.

The effect of added solvent is seen if sample A and B (2 and 5% acid) are treated with 50% (on solids) hexanol (heated to 85° then cooled to RT) and then titrated with 0.5N KOH. Both samples show complete uptake or titration of the core acid by the KOH. Additionally, both samples readily swell in the presence of KOH/hexanol at 85°.

EXAMPLE 2

Swelling with KOH and Further Polymerization-Formation of Air Voids

A. To a 5-liter flask fitted with reflux condenser, nitrogen inlet and padding stirrer is added 989 g. of Sample B of Example 1. The reactor is heated to 85° and 60.9 g. of 10% KOH is added. The mixture is stirred at 85° for 30 minutes and 1.0 g. of sodium persulfate is added followed by the addition of a monomer emulsion consisting of 243 gm. of water, 3.3 g. of 23% sodium dodecyl benzene sulfonate and 576 g. of styrene over a 1.5 period. The sample is heated at 85° for 15 minutes and cooled to RT.

B. Sample C of Example 1 is polymerized with 45 parts of styrene by the procedure used in A of Example 2. The only difference is the use of 94 g. of 10% KOH for swelling.

The samples of Example 2 are analyzed by Nanosizer and their average particle sizes measured (Table 2). Samples of the swollen particles are allowed to dry. The dry powders are immersed in hydrocarbon oil ($n_D=1.51$) and examined with an optical microscope. The swollen particles show dark circles due to air voids inside the particles. The shells are invisible due to their refractive indices being similar to the oil. The swollen particles are incorporated into films to measure the Kubelka-Munk scattering coefficient (S/Mil, Table 2) as described in U.S. Pat. No. 4,427,836.

TABLE 2

| Sample | Final Particle Size, microns | Void Size, Microns | S/Mil |
|---|---|---|---|
| Example 2-A | 0.5 | 0.35-0.4 | 0.26 |
| Example 2-B | 0.5 | 0.35-0.4 | 0.40 |

EXAMPLE 3

Example 1A was repeated except that ratio of core weight to sheath weight was 1 to 20 and the level of methacylic acid was 3%. In a series of five experiments, A through E, 1.0 equivalent of 3% sodium hydroxide were used as the neutralizing agent in combination with, in the case of B, C, D, and E respectively, 10% of Texanol ® (3-hydroxy-2,2,4-trimethyl pentyl isobutyrate), 1-hexanol, 1-pentanol or ethanol, based on weight of core-shell polymer. Each of the mixtures in turn was heated to 90° C. for one hour. Scattering coefficients as in Example 2 were measured, with the results as shown in the following Table 3.

TABLE 3

| Sample | S/Mil |
|---|---|
| Example 3A | 0 |
| Example 3B | 0.21 |
| Example 3C | 0.15 |
| Example 3D | 0.16 |
| Example 3E | 0.29 |

EXAMPLE 4

Example 3 was repeated except that no methacrylic acid was present in the sheath and the ratio of BMA to MMA was 20 to 80. Using the same neutralization agent and solvent as in Examples 3A through E, respectively, the scattering coefficients were as shown in the following.

TABLE 4

| Sample | S/Mil |
|---|---|
| Examples 4A | 0 |
| Examples 4B | 0 |
| Examples 4C | 0.35 |
| Examples 4D | 0.30 |
| Examples 4E | 0 |

We claim:

1. Process for making core-sheath polymer particles containing voids, said particles useful for opacifying, comprising (A) emulsion polymerization a core from a core monomer system comprised of at least one ethylenically unsaturated monomer containing acid functionality; (B) encapsulating said core with a hard sheath by emulsion polymerizing a sheath monomer system in the presence of said core, said sheath permitting penetration of fixed or permanent bases; and (C) swelling at elevated temperature the resultant core-sheath polymer particles with fixed or permanent base so as to produce a dispersion of particles which, when dried, contain a microvoid which causes opacity in compositions in which they are contained, provided that either (1) said sheath comprises at least about 1% acid functional monomer or (2) said swelling takes place in the presence of solvent.

2. Process of claim 1 wherein said hard sheath (B) is polymerized from a monomer system comprising about 5 to 10% by weight acid functional monomer.

3. Process of claim 1 comprising treating the particles with solvent prior to, after, or during addition of base.

4. Process of claim 3 comprising using a solvent selected from the group consisting of hexanol, ethanol, pentanol, 3-hydroxy-2,2,4-trimethylpentyl isobutyrate, and toluene.

5. Process of claim 1 comprising neutralizing the particles with a fixed or permanent base selected from the group consisting of potassium hydroxide, lithium hydroxide, sodium hydroxide, and calcium hydroxide.

6. Process of claim 1 comprising neutralizing the particles with fixed or permanent base in the presence of a solvent, said solvent assisting in penetration of sheath with base.

7. Process of claim 6 wherein said sheath monomer system functions as the solvent for said sheath.

8. Process of claim 1 wherein the elevated temperature in step (C) is about 50° C. to about 100° C.

9. Process of claim 1 wherein at least one additional sheath (D) is polymerized subsequent to step (C).

10. Process of claim 9 wherein said additional sheath (D) is polymerized from styrene.

11. Process of claim 10 wherein said sheath (B) monomer system is all acrylic.

12. Process of claim 11 wherein said sheath (B) monomer system is comprised of about 1 to about 10% by weight methacrylic acid and other monomers selected from the group consisting of butyl methacrylate and methyl methacrylate, said sheath (B) being permeable to fixed or permanent base at elevated temperature but not at room temperature.

13. Process of claim 12 wherein said sheath polymer is treated with hexanol solvent.

14. Process of claim 13 wherein said methacrylic acid comprises about 1 to 2% of said sheath monomer system.

15. Process of claim 12 wherein said sheath is not treated with solvent and said sheath monomer system is comprised of about 5 to about 10% acid functional monomer.

16. Composition comprising core-sheath polymer particles prepared by the process of claim 1.

17. Articles coated with, impregnated with, or molded with the composition of claim 16.

* * * * *